United States Patent
Gonzalez et al.

(10) Patent No.: US 6,860,328 B2
(45) Date of Patent: Mar. 1, 2005

(54) METHOD FOR SELECTIVELY POSITIONING PROPPANTS IN HIGH CONTRAST PERMEABILITY FORMATIONS TO ENHANCE HYDROCARBON RECOVERY

(75) Inventors: Manuel E. Gonzalez, Kingwood, TX (US); Joseph H. Schmidt, Galveston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 10/417,759

(22) Filed: Apr. 16, 2003

(65) Prior Publication Data

US 2004/0206497 A1 Oct. 21, 2004

(51) Int. Cl.⁷ .............................................. E21B 43/14
(52) U.S. Cl. .................................... 166/280.1; 166/281
(58) Field of Search .......................... 166/280.1, 280.2, 166/281

(56) References Cited

U.S. PATENT DOCUMENTS

| | | | |
|---|---|---|---|
| 3,127,937 A | * 4/1964 | Kern et al. | 166/280.1 |
| 3,818,990 A | 6/1974 | Coulter | |
| 3,937,283 A | 2/1976 | Blauer et al. | |
| 4,157,116 A | * 6/1979 | Coulter | 166/280.1 |
| 4,509,598 A | 4/1985 | Earl et al. | |
| 4,665,982 A | 5/1987 | Brown | |
| 4,733,729 A | 3/1988 | Copeland | |
| 4,887,670 A | 12/1989 | Lord et al. | |
| 4,938,286 A | 7/1990 | Jennings, Jr. | |
| 5,159,979 A | 11/1992 | Jennings, Jr. | |
| 5,547,023 A | * 8/1996 | McDaniel et al. | 166/280.1 |
| 5,582,250 A | 12/1996 | Constien | |
| 6,342,467 B1 | 1/2002 | Chang et al. | |

OTHER PUBLICATIONS

Barree, R. D. ", Mukherjee, H." (SPE Members), Design Guidelines for Artificial Barrier Placement and Their Impact on Fracture Geometry, Society of Petroleum Engineers, Inc. (SPE) 29501, 542–558, 1995.
IVAN, C., Bruton, J., Bloys, B. How Can We Best Manage Lost Circulation? American Association of Drilling Engineers 2003 National Technology Conference, 1–8, 2003.
Mukherjee, H., Paoli, B.F., McDonald, T.", Cartaya, H.", Anderson, J.A. (SPE Members), Successful Control of Fracture Height Growth by Placement of Artificial Barrier, Society of Petroleum Engineers, Inc. (SPE), 89–95, 1995.

* cited by examiner

*Primary Examiner*—David Bagnell
*Assistant Examiner*—Elton McWilliams
(74) *Attorney, Agent, or Firm*—Richard J. Schulte

(57) ABSTRACT

The present invention provides a method for enhancing the production of hydrocarbons from a subterranean formation. A hydrocarbon bearing formation, surrounding a well bore, is fractured with a fracturing fluid to create one or more fractures in the formation. The formation includes a higher permeability zone and a lower permeability zone with the fractures extending across both the higher and lower permeability zones. The lower permeability zone may contain a substantially higher concentration of hydrocarbons, oil and gas, than does the higher permeability zone which may generally be depleted of hydrocarbons. Proppant is then selectively positioned, such as by allowing the proppant to "float" in a carrier fluid to the top of the fracture, with a majority of the proppant being positioned in the lower permeability zone. The fracture is allowed to close about the proppant to create at least one high conductivity channel in the lower permeability zone.

20 Claims, 5 Drawing Sheets

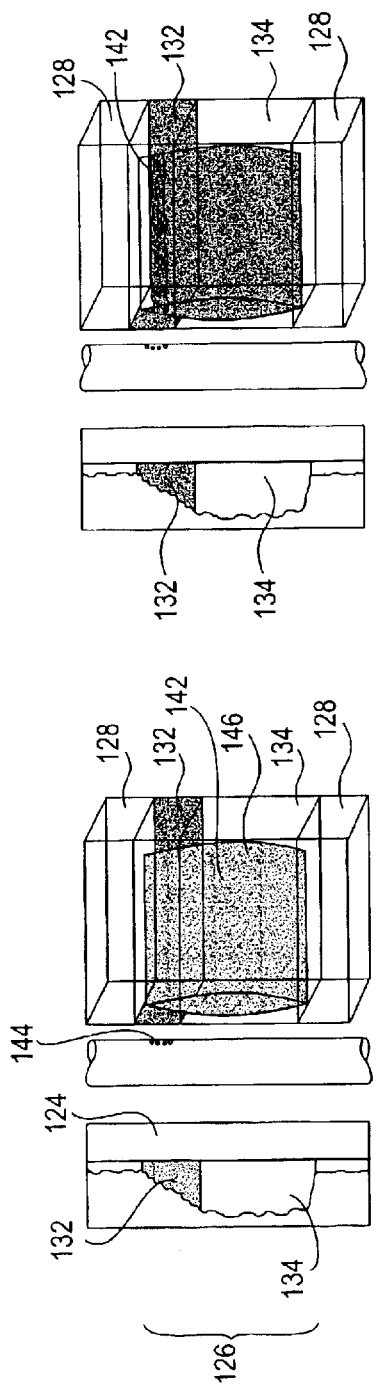
FIG. 4A
FIG. 4B
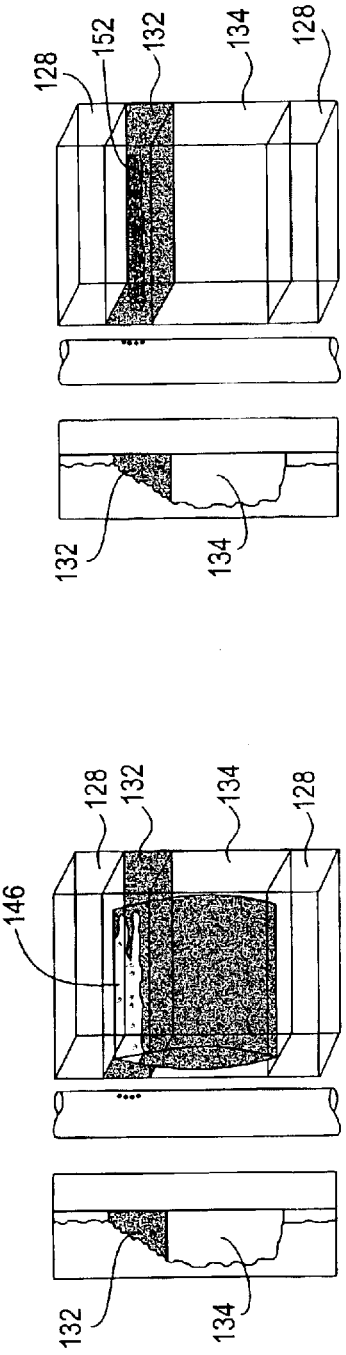
FIG. 4C
FIG. 4D

METHOD FOR SELECTIVELY POSITIONING PROPPANTS IN HIGH CONTRAST PERMEABILITY FORMATIONS TO ENHANCE HYDROCARBON RECOVERY

TECHNICAL FIELD

This invention relates generally to well stimulation methods using hydraulic fracturing to enhance hydrocarbon recovery from subterranean formations, and more particularly, to those methods which utilize proppants to hold fractures open.

BACKGROUND OF THE INVENTION

Hydraulic fracturing is a well stimulation technique designed to enhance the production of hydrocarbons from a well. This technique creates highly permeable conductive fractures or channels in a producing formation surrounding a well bore. The fracturing process typically involves injecting fluids down a perforated well bore at sufficient rate and pressure to rupture the formation, thereby creating one or more fractures in the reservoir rock. High pressure pumping is then continued to extend the fractures generally radially outwardly from the well bore. In order that the fractures which are created do not close once the fracturing pressure is released, the fracturing fluid typically contains a particulate material, known as a propping agent or proppant, which is dispersed throughout the fractures. Once the pressure is released and the fracturing fluid leaks off into the formation, the fractures close about the proppant. The captured proppant maintains the fracture opening by resisting forces tending to close the fracture. The proppant laden fractures produce highly conductive channels which facilitate the flow of desired fluids from the formation into the well bore.

In the past, propped hydraulic fracturing was not commonly used to stimulate formations having high contrast in permeability. Often sands have a fining upward sequence. The upper part of the sands have a low permeability and the lower part has a very high permeability. For example, the upper part of the formation may have permeabilities in the range of 20 to 300 mD, while the lower part has permeabilities ranging from 1,000 to 10,000 mD.

During production, the high permeability lower zones of the formation may be swept with water to maximize hydrocarbon extraction. Meanwhile, the concentration of hydrocarbons can remain high in relatively low permeability zones. Fracture stimulation in such an environment often props open both the oil and water-bearing portions of the formation, which results in water production overwhelming the oil or gas production.

Accordingly, there is a need for a hydraulic fracturing technique which enhances the conductivity and production of oil and/or gas from lower permeability hydrocarbon bearing zones while minimizing increases in the conductivity of connected zones having higher permeability and containing higher concentrations of water. The present invention addresses this need.

SUMMARY OF THE INVENTION

The present invention provides a method for enhancing the production of hydrocarbons from a subterranean formation. A hydrocarbon bearing formation, surrounding a well bore, is fractured with a fracturing fluid to create one or more fractures in the formation. The formation includes a higher permeability zone and a lower permeability zone with the fractures extending across both the higher and lower permeability zones. Ideally, the lower permeability zone contains a substantially higher concentration of hydrocarbons, oil and gas, than does the higher permeability zone which may be generally exhausted of hydrocarbons. Proppant is then selectively positioned in the fractures using a carrier fluid with a majority of the proppant being positioned in the lower permeability zone. The fracture is allowed to close about the proppant to create one or more high conductivity channels in the lower permeability zone. Through the use of this method the overall productivity of the lower permeability zone is increased relative to the overall productivity of the higher permeability zone thus enhancing the production of hydrocarbons from the hydrocarbon bearing formation.

The proppant may be less dense than the carrier fluid. This allows the majority of the proppant to be selectively positioned in the fracture or fractures by floating in the carrier fluid toward the top of the fracture. Alternatively, a proppant which is denser than the carrier fluid could be chosen if it is desired to have the proppant sink within a fracture.

The proppant may be selectively deployed in the lower permeability zone using a single stage proppant placement or using a dual stage proppant placement. In the single stage proppant placement, the fracturing fluid is ideally also used as the carrier fluid to selectively position the majority of the proppant in the lower permeability zone. Relative differences between the densities of proppant and the fracturing/carrier fluid allows the buoyancy of the proppant to selectively position the proppant in the fracture in the desired low permeability zone.

In a dual stage proppant placement, the formation is fractured in a first stage with the fracturing fluid. Then proppant is transported by the carrier fluid, in a second stage, to be selectively positioned in the fracture or fractures in the lower permeability zone. Ideally, the fracturing fluid is denser and more viscous than the carrier fluid such that the proppant laden carrier fluid will reside upon the fracturing fluid in the low permeability zone while the fracturing fluid is in the higher permeability zone. Also, the density of the proppant may be chosen so that the proppant floats or sinks within the fracture, as desired. When the fracture is allowed to close, the majority of the proppant will then be captured in the desired lower permeability zone.

It is an object of the present invention to provide a stimulation treatment which increases the rate at which a hydrocarbon bearing formation delivers hydrocarbons to a well bore.

It is another object to selectively place proppant in zones of a formation containing a relative high percentage of hydrocarbons but low permeability and to minimize the placement of proppant into high permeability zones having a relatively high watercut such that the relative productivity in the low permeability zone increases more than in the high permeability zone.

It is yet another object to provide a proppant that has a lower specific gravity than a carrier fluid used to transport the proppant to a hydraulically induced fracture such that the proppant floats toward the top of the fracture to create a high conductivity proppant channel in an otherwise low permeability zone of a hydrocarbon bearing formation.

Still another object to is optimize hydrocarbon production by placing proppants in zones containing significant quantities of hydrocarbons while avoiding placing proppants in connected zones having high watercuts.

BRIEF DESCRIPTION OF THE DRAWINGS

The invention will be better understood in conjunction with the following description, claims, and drawings wherein:

FIGS. 4A–D are schematic drawings illustrating a second embodiment wherein a dual stage fracturing and proppant deployment is used to stimulate a formation similar to that of FIGS. 2A–D.

BEST MODE(S) FOR CARRYING OUT THE INVENTION

The present invention includes a method for enhancing the production of hydrocarbons from a subterranean formation. A well bore is placed in fluid communication with a formation containing hydrocarbons. The formation includes zones of higher and lower permeability. The formation is pressurized with a fracturing fluid to open one or more fractures in the zones of higher and lower permeability. Proppant is then selectively positioned to be substantially disposed in the zone of lower permeability. Ideally, the relative density of the proppant, as compared to a fluid carrying the proppant, will allow the proppant to achieve this selective positioning in the fractures. For example, if the proppant is lighter than the carrier fluid, and the viscosity of the carrier fluid carrying the proppant does not substantially inhibit movement of the proppant within the fracture, the proppant can be made to float upwardly to be disposed near the top of the fracture. Alternatively, if a supporting layer of material, such a dense and viscous fracturing fluid, is placed beneath a less dense proppant laden carrier fluid, then the proppant can still be selectively positioned in the upper zone of lower permeability. This lower permeability zone often has a relatively high concentration of hydrocarbons therein while the higher permeability zone is often depleted of hydrocarbons, such as by water flooding.

The fractures are then allowed to close about the proppant to create a highly conductive proppant channel in the lower permeability zone. As the proppant has been substantially positioned in the zone of lower permeability, the fractures ideally remain propped opened to a greater extent in this lower permeability zone than in the higher permeability zone. Accordingly, the lower permeability zone now contains a highly conductive proppant channel such that the production of hydrocarbons from the formation is enhanced because of the selective positioning of the proppant.

I. Embodiments of Selectively Positioning Proppants in High Contrast Permeable Formations

A. First Embodiment—Single Stage Proppant Placement

Figure 1:
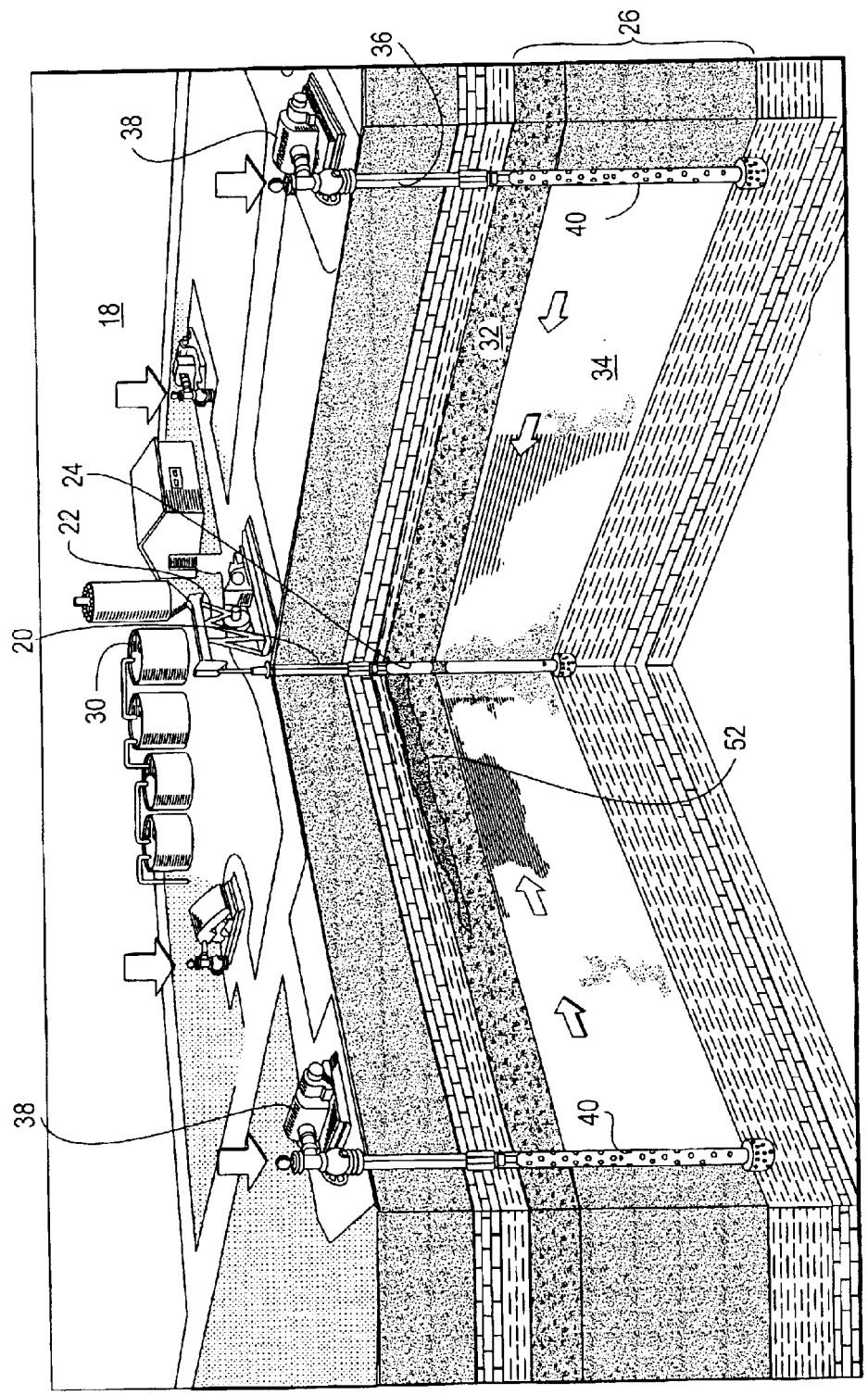
FIG. 1 is a schematic drawing illustrating a production facility and well which produces hydrocarbons from a hydrocarbon bearing formation having a high contrast in permeability.

FIG. 1 shows a production facility 18 for producing hydrocarbons from a production well 20. The hydrocarbons may be oil, gas or a combination thereof. Production well 20 includes a pumping unit 22 and a well bore 24 which is in fluid communication with a hydrocarbon producing formation 26. A tank farm 30 collects the hydrocarbons produced from the well 20.

Formation 26 includes an upper zone 32 overlying an adjacent lower zone 34. In this example, the permeability of lower zone 34 is generally greater than that of upper zone 32. It is common practice to water sweep or flood formation 26 to improve the recovery of hydrocarbons, leaving a high concentration of water in the higher permeability lower zone 34. Injection wells 36 including injector pumps 38 and injection well bores 40 are used to flood water from the injection well bores 40 to production well 20.

In certain regions or zones where the permeability varies considerably from top to bottom, i.e. the permeability is of high contrast, the concentration of hydrocarbons remains higher in the relatively low permeability zones and still has significant productivity potential. Conventional fracturing treatment would likely connect the zones 32 and 34 together and water would be produced as a result. The majority of the fluids produced from formation 26 are from the lower, more permeable zone 34 of the formation 26. The production from well 20 may be in excess of 90% water prior to employing the simulating treatment of the present invention. A logging program may be used to verify that the narrower upper, less permeable zone 32 of the formation still has a significantly high concentration of hydrocarbons.

Figure 2A:
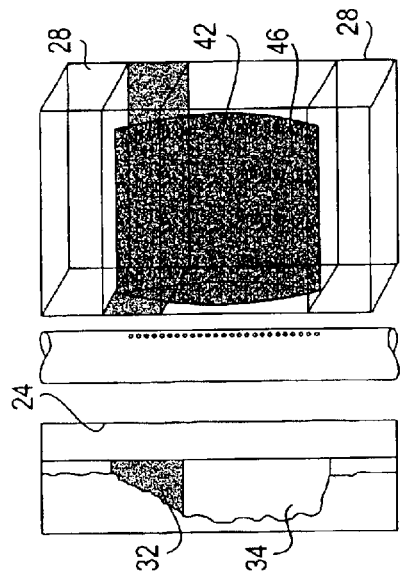
FIGS. 2A–D are schematic drawings of a first embodiment of the present invention, each drawing including a sectional view and a perspective view of a well bore and adjacent formation wherein proppant is selectively positioned, in a single stage, in a hydraulically induced fracture to enhance the productivity of a lower permeability upper zone relative to that of a fluidly connected higher permeability lower zone.

Turning to FIGS. 2A–D, steps used in a single stage fracturing treatment are schematically illustrated. FIG. 2A shows well bore 24 which is in fluid communication with hydrocarbon bearing formation 26. Upper and lower layers 28, of very low permeability rock such as shale, bound and fluidly contain formation 26. Formation 26 includes lower permeability upper zone 32 and a higher permeability lower zone 34. Zones 32 and 34 are often composed of sandstone. Typical permeabilities in the lower permeability upper zone 32 may range from 200 to 400 mD, while in the higher permeability lower zone 34 permeabilities may range 1,000 to 4,000 mD. It is common practice to water sweep or flood the higher permeability lower zone 34 to improve the recovery of hydrocarbons, leaving a high concentration of water in higher permeability zone 34.

Figure 2B:
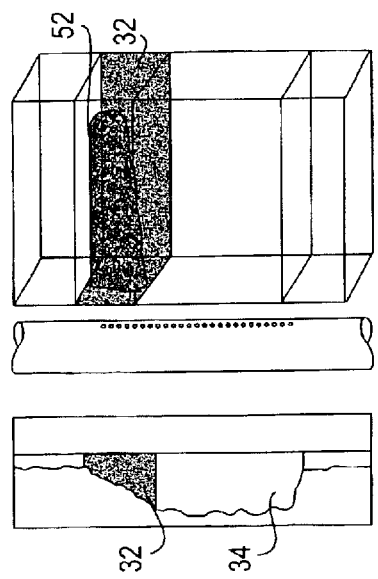

After most of the hydrocarbons have been deleted from high permeability zone 34 by water flooding, formation 26 is hydraulically fractured in accordance with a first embodiment of the present invention. A fracturing fluid, laden with proppant 42, passes through perforations 44 in well bore 24 to create one or more fractures 46 extending across upper and lower zones 32 and 34. As seen in FIG. 2B, the proppant laden fluid fills the void created by open fractures 46. Perforations 44 may extend along the entire depth of formation 26 which is to be fractured.

Hydraulic fracturing treatments include injecting the fracturing fluid at a high rate which exceeds the rate that the fracturing fluid leaks-off into formation 26. Under these conditions, the portion of the formation 26 surrounding well bore 24 will exceed the in situ compressive loads causing tensile rock failure and creating one or more conductive channels, or fractures 46 in formation 26. Fractures 46 extend radially outwardly from and vertically adjacent to well bore 24 thereby fluidly interconnecting higher permeability lower zone 34 and lower permeability upper zone 32.

Figure 2C:
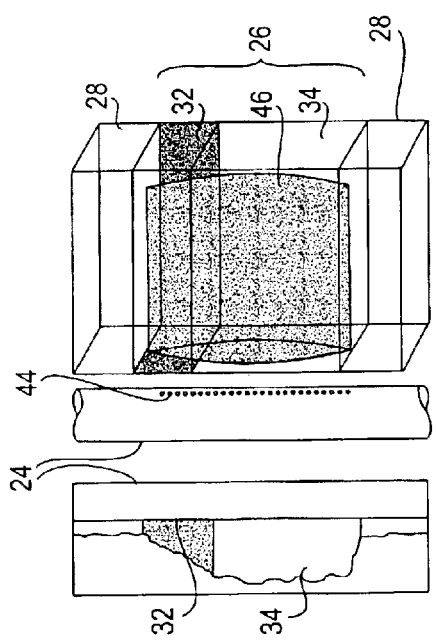

The relative densities of proppant 42 and the fracturing fluid are chosen such that the substantial majority of proppant is selectively positioned within the zone of the formation where it is desired to enhance formation conductivity. In this case, it is desired to increase the conductivity of upper zone 32 relative to lower zone 34. Proppant 42 is chosen to have a density less than that of the fracturing fluid so that proppant 42 will float to the top of fractures 46, as seen in FIG. 2C. In this first embodiment, for simplicity, the fracturing fluid is chosen to also serve as a carrier fluid for transporting the proppant. This allows the fracturing and the selective positioning of the proppant to be accomplished in a single stage using with the proppant laden fracturing/carrier fluid. The viscosity of the carrier fluid should be sufficiently low to permit proppant 42 to migrate or "float" within the carrier fluid. Proppant 42 will then collect in a proppant cake 50 in upper zone 32, as indicated in FIG. 2C.

Figure 2D:
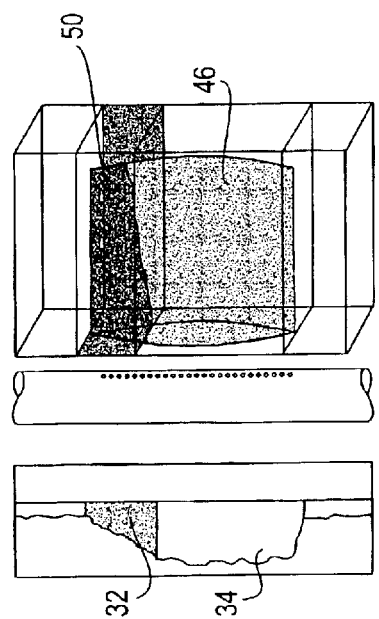

Finally, after the proppant is positioned in the desired location, i.e., in upper zone 32, the pressure on the fracturing/carrier fluid is permitted to drop through dissipation of fluids into formation 26. This allows fractures 46 in formation 26 to close thus capturing proppant cake 50 in upper zone 32 as shown in FIG. 2D. Thus a highly conductive proppant channel 52 is formed in upper zone 32. Meanwhile, the portion of fractures 46 in lower zone 34 will "heal" leaving the original conductivity of lower zone 34 virtually unchanged. Consequently, the relative productivity of the upper zone 32 is enhanced as compared to that of lower zone 34.

For this single stage placement of proppant 42, the preferred fracturing fluid in this exemplary embodiment is calcium chloride brine having a specific gravity of at least 11.2 lb/gal. The preferred proppant is walnut hull ground to a mesh size of 10/40. Calcium chloride was chosen as the preferred fracturing/carrier fluid in this embodiment because it can be mixed with water to make a brine solution with sufficient density to float the proppant, is readily available, and is relatively inexpensive. Tests have shown that approximately 95% of the walnut hull proppant 42 will float in calcium chloride brine having a specific gravity of 11.2 lb/gal. This relatively heavy brine is also beneficial in that it provides some additional viscosity fluid-loss control. If desired, additional fluid loss additives may be added to the fracturing/carrier fluid.

Table 1 describes the composition of the fracturing/carrier fluid used in this exemplary single stage proppant deployment

TABLE 1

Fracturing Fluid Composition

| Component | Name | Quantity |
|---|---|---|
| Base Fluid | Water | 1,000 gal |
| Salt | Calcium Chloride | 9,602 lb/1,000 gal |

Water flooding may again be used to drive hydrocarbons to well bore 24. However, in this instance, the water will also drive through proppant channel 52 and upper zone 32 carrying hydrocarbons with the water. Accordingly, overall oil/hydrocarbon production from upper zone 32 and lower zone 34 is enhanced over that of formation 26 which has not received the fracture treatment of the present invention.

Figures 3A, 3B:
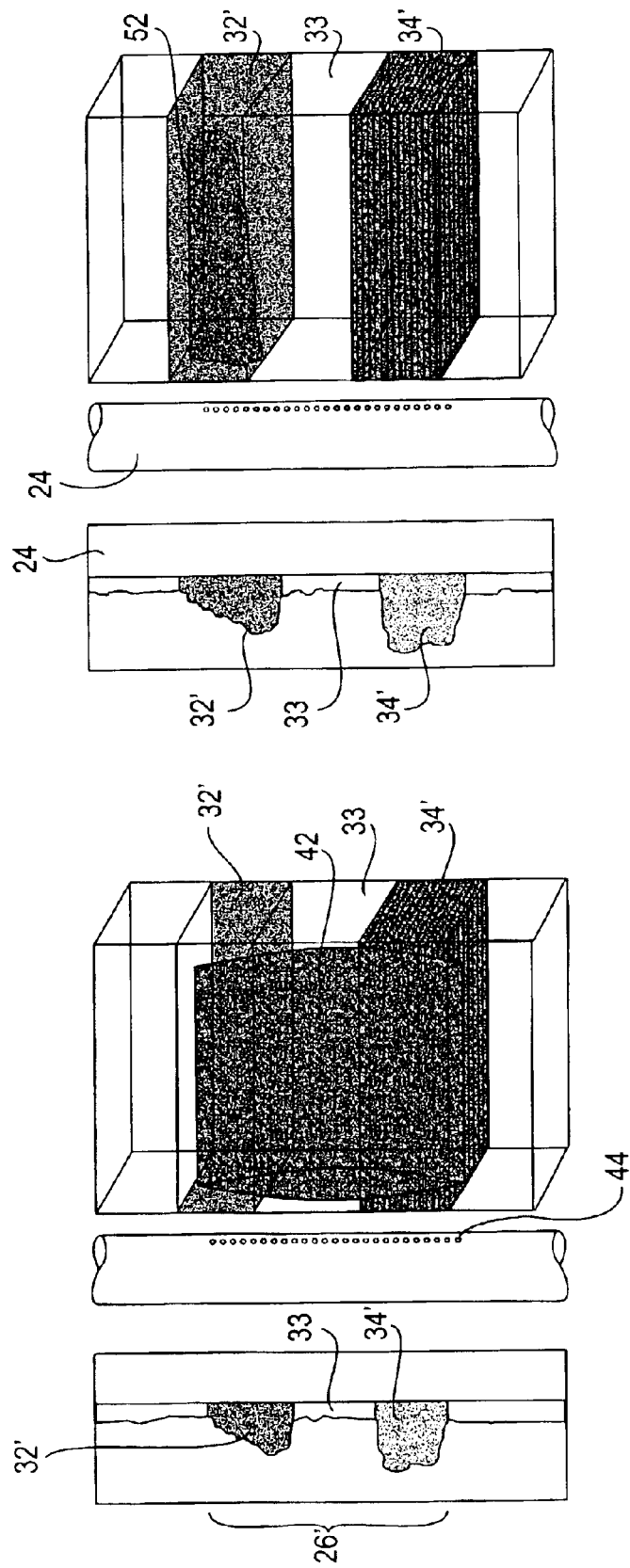
FIGS. 3A–B are schematic drawings illustrating a formation having a lower permeability upper zone, a higher permeability lower zone, and an intermediate zone of very low permeability wherein proppant is selectively positioned in a single stage in a fracture.
Figure 5B:
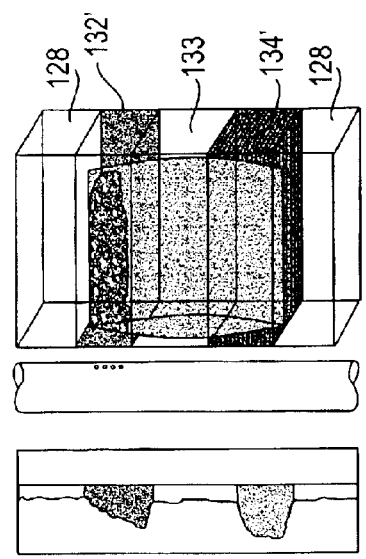
FIGS. 5A–D are schematic drawings illustrating the second embodiment of this invention being implemented where a dual stage fracturing and proppant deployment technique is used in a formation similar to that FIGS. 3A–B.
Figure 5A:
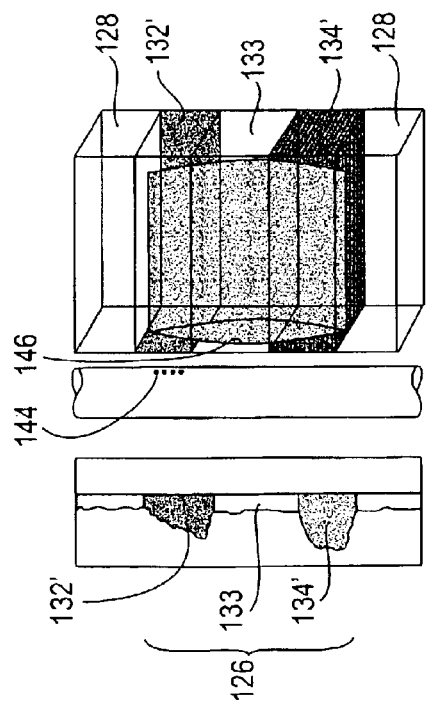
Figure 5D:
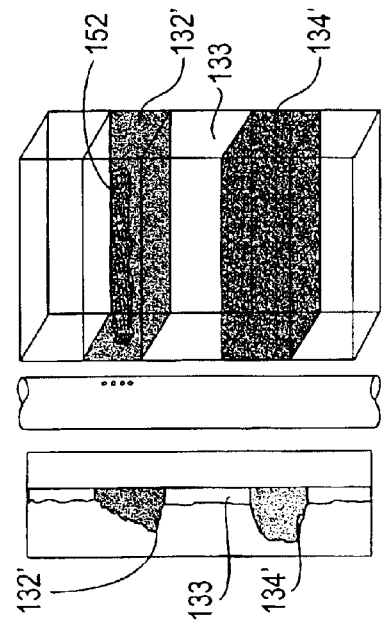
Figure 5C:
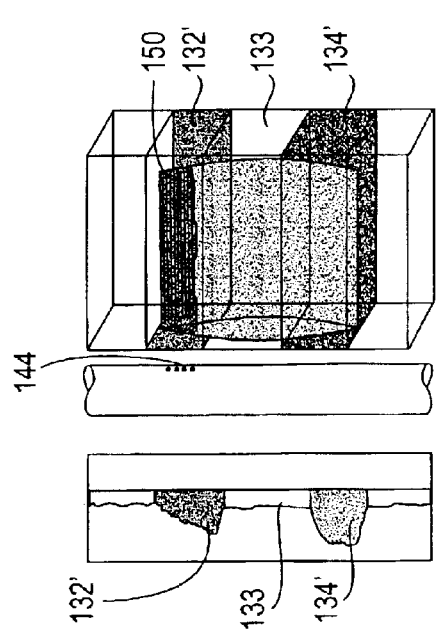

FIGS. 3A and 3B illustrate that the single stage placement method of the first embodiment can be used in a formation 26'. Formation 26' further includes a very low permeability intermediate layer 33, such as shale, which separates a low permeability upper zone 32' from a higher permeability lower zone 34'. As a practical matter, when fracturing upper zone 32', the fracturing fluid may also fracture intermediate zone 33 and lower zone 34'. Conventionally, there has been reluctance to fracture such low permeability zones or formations having relatively high hydrocarbon concentrations when there is danger that an intermediate layer and adjacent high permeability zone with high watercut may also be fractured. Such fracturing may allow water from the high watercut zone or formation to enter the high hydrocarbon concentration zone through the intermediate very low permeability layer. This concern can be mitigated using the present invention which allows the for selectively placing proppant in upper zone 32' to enhance its conductivity, as compared to that of lower zone 34'. The fractures generally "heal" in the intermediate very low permeability zone and the high watercut lower zone 34' which are generally free of proppant opened fractures. Consequently, the danger of providing a highly conductive fluid pathway between the lower zone or formation 34' and upper zone or formation 32' are significantly reduced as compared to using conventional fracturing techniques employing proppants. Further details regarding selection of proppant, fracturing fluid and carrier fluid will be described in greater detail below after discussing a dual stage proppant placement treatment technique.

B. Second Embodiment—Dual Stage Proppant Placement

A second embodiment of the present invention is shown in FIGS. 4A–D. Although more complex, this embodiment is preferred over that of the simpler single stage proppant placement. This dual stage embodiment relies upon the use of a first stage heavily weighted pad, disposed substantially in a higher permeability zone, to support a second stage proppant laden fluid, residing in a lower permeability zone, to selectively position proppant near the top of a fracture to enhance productivity of a high contrast permeability formation.

In this embodiment, a well bore 124 is in fluid communication with a hydrocarbon bearing formation 126. Shale layers 128 bound formation 126. Formation 126 includes a lower permeability upper zone 132 and a higher permeability lower zone 134. Perforations 144 in well bore 124 provide fluid communication between well bore 124 and formation 126. In this embodiment, perforations 144 extend only along the depth of upper zone 132 and riot along lower zone 134. Formation 126 is hydraulically fractured preferably with a dense, cross-linked fracturing fluid to create one or more fractures 146, as seen in FIG. 4A.

By way of example and not limitation, the preferred fracturing fluid or pad is a combination of brine, a gelling agent, a cross-linking agent and a chemical breaker. More specifically, in this example the brine is saturated calcium chloride brine, the gelling agent is hydroxyl-ethyl cellulose and the cross-linking agent is zirconium oxychloride. The breaker allows the viscosity of the fracturing fluid to eventually drop over time. Further, a fluid loss additive is ideally added to the fracturing fluid. In this example, kerosene is added at 5% by volume, and silica flour at 15 lb/Mgal. This fluid loss additive does not significantly adversely affect cross-linking. The first stage heavy cross-linked brine fracturing fluid keeps fracture 146 open and the fluid loss additive within the fracturing fluid bridges against formation 126 to reduce leak off.

Table 2 more specifically lists the composition of the fracturing fluid.

TABLE 2

Fracturing Fluid (Pad) Composition

| Component | Name | Quantity |
|---|---|---|
| Base fluid | Water | 1 Mgal |
| Salt | Calcium Chloride | 9,602 lb/Mgal |
| Gelling Agent | Hydroxyl-ethyl cellulose | 40 lb/Mgal |
| Cross-linking agent | Zirconium Oxychloride | 4 gal/Mgal |
| Breaker | Oxidizer:catalyst | 10 gal/Mgal: 2 gal/Mgal |
| Fluid Loss Additive | Kerosene | 5% by volume |
| | Silica Flour | 15 lb/Mgal |
| | Regain | 15 lb/Mgal |

TABLE 2-continued

Fracturing Fluid (Pad) Composition

| Component | Name | Quantity |
|---|---|---|
| Wetting Agent | Surfactant | 2 gal/Mgal |
| Microorganism Control | Biocide | 0.3 gal/Mgal |

The viscous fracturing fluid or pad is pumped down well bore 124 and out through perforations 144 into formation 126. The fracturing fluid initiates a fracture 146 in lower permeability upper zone 132 which then propagates downwardly to the higher permeability lower zone 134. The schedule for pumping amount, rate, and proppant loading is readily planned using conventional modeling software for hydraulic fracturing. Examples of such commercially available finite element software include Gohfer (Grid Orientated Hydraulic Fracture Extension Replicator), available from Stim-Lab, a Core Laboratories Company, of Duncan, Okla.

In a second stage, a carrier fluid laden with proppant 142 is pumped inside the established fracture 146, as seen in FIG. 4B. As perforations 144 are adjacent upper zone 132, the proppant laden carrier fluid will flow and finger above the heavy cross-linked brine first stage within upper zone 134 as illustrated in FIG. 4C due to the high density and relatively high viscosity of the first stage cross-linked fracturing fluid. A filter cake 150 is formed in fracture 146. Sufficient proppant laden carrier fluid is pumped to generally displace the fracturing fluid in the portion of fracture 146 which is within upper zone 132.

When fracture 146 closes, a propped high conductivity channel 152 is formed in the low permeability hydrocarbon bearing upper zone 132 of the formation 126, as seen in FIG. 4D. The overall conductivity of upper zone 132 is thus enhanced relative to that of the water bearing lower zone 134. The flow of hydrocarbons from upper zone 132 is also increased thereby enhancing the overall production of hydrocarbons from formation 126.

The preferred proppant is again walnut hulls mesh size 10/40. However, the carrier fluid in this exemplary embodiment is slick water having a composition as shown below in Table 3.

TABLE 3

Proppant Laden Carrier Fluid

| Component | Name | Quantity |
|---|---|---|
| Water | Water | 1 Mgal |
| Salt | KCL | 2% by volume |
| Microorganism Control | Biocide | 0.25 lb/1,000 gallons of water; |
| Wetting Agent | Surfactant | 2 gal/1,000 gallons of water; |
| Breaker | Oxidizer | 1 lb/1,000 gallons of water |

Alternatively, the carrier fluid could simply be water. The walnut hulls would then be allowed to sink in the water. It is not required that the proppant 142 float within the carrier fluid as proppant 142 will be supported by the denser fracturing pad fluid. However, it is also possible to use a carrier fluid which is denser than walnut hulls if it is desired to float the proppant to the top of fracture 146. In this case, the calcium chloride brine described in the first embodiment may be used. Again, the use of the high viscosity fracturing fluid as a pad supporting the carrier fluid assists in selectively positioning the proppant in the portion of fracture 146 located within upper zone 132.

FIGS. 5A–D illustrate that the dual stage proppant placement method of the second embodiment can be used in a formation 126' having a very low permeability intermediate layer 133 (shale) between a low permeability upper zone 132' (sandstone) and a higher permeability lower zone 134' (sandstone). The same dual stage proppant placement method as described above and shown in FIGS. 4A–D may be used. However, in this instance, the presence of the intermediate very low permeability layer 133 of shale further helps prevent proppant from flowing into lower zone 134'. Thus conductivity gains in formation 126' due to proppant placement are essentially limited to upper zone 132.

II. Design of Proppant and Fluid Selection and Fracture Modeling

A. Fracture Modeling

A 3D fracture simulation program may be used to simulate and design the fracturing job. More specifically, a grid-based, finite element fracture simulator is preferred. The design simulator can help to account for variable leak-offs and fluid and slurry density, as well as fluid viscosity variations. Simulation runs are performed to obtain optimum pumping schedule and thus the most effective proppant placement using different densities and fluid viscosities. Those skilled in the art can readily practice the present invention with the assistance of commercially available, conventional simulation programs to plan the fracturing job to meet the particular characteristics of a formation to be stimulated. As described above, the Gohfer simulation is a preferred tool to accomplish this planning.

B. Proppant Selection

Proppant material should be relatively inexpensive and should provide sufficient conductivity when finally positioned within a fracture. Furthermore, the proppant should provide sufficient strength such that it is not crushed and maintains high conductivity in the propped fracture channels. If the proppant is to be selectively positioned through its buoyancy in a carrier fluid, then the proppant should have a low specific gravity or density relative to the fracture fluid or proppant carrier fluid. The differences in relative densities enable the proppant to flow to the top of a fracture before the fracture closes. Lightweight materials such as are used in drilling mud and cementing fluids, as well as hollow and solid spheres, may be used as proppants.

Further information regarding proppants and proppant selection may be found in Howard, G. C. and Fast, C. R., *Hydraulic Fracturing*, Monograph Series, SPE, Richardson, Tex. (1970).

Table 4 provides a list of potential proppants which may be used with the present invention.

TABLE 4

Proppant Candidates

Walnut Hulls
Hollow spheres (glass, ceramic, elastomer, plastic, etc.)
Solid spheres (plastics, elastomers, wood)
Non spherical proppant that float C. Carrier Fluids for Proppants Graded walnut hulls serve as a preferred proppant because of their lightweight properties. Still, walnut hull proppant has a specific gravity greater than water. Accordingly, the carrier fluid has to be densified to allow the walnut hull proppant to float. However, the viscosity of a carrier fluid should be sufficient low to allow the proppant to move relatively freely through the carrier fluid if so desired. Chemical breakers can be added to the carrier fluid in the event there is a need to decrease viscosity of the carrier fluid.

Calcium chloride was chosen as the preferred carrier fluid in the single stage proppant deployment embodiment because it can be used with water to make a brine solution with sufficient density to float the walnut hull proppant. Also, it is readily available and is relatively inexpensive.

Tests were performed with carrier fluids of different specific gravities to determine the fluid density required to float the proppant. The results shown in Table 5 suggest the walnut carrier fluid should have a density of 11.2 ppg (pounds per gallon) or a specific gravity of 1.35 for approximately 95% of the walnut hulls to float to the surface, a density of at least 10.74 ppg or a specific gravity of 1.29 for approximately 50% of the walnut hulls to float to the surface, and a density of 10.0 ppg or a specific gravity of 1.20 for approximately 5% of the walnuts hulls to float to the surface.

TABLE 5

Specific Gravity of Calcium Chloride Brine Require to Suspend the Proppant

| Specific Gravity of $CaCl_2$ Brine | Walnut Hull Proppant Suspension Properties |
|---|---|
| 1.20 | 5% floated, 95% settled; |
| 1.29 | 50% floated, 50% settled; |
| 1.35 | 95% floated, 5% settled. |

D. Selection of Fracturing/Pad Fluid

The composition of the fracturing/pad fluid used in the preferred dual stage proppant deployment is listed in Table 2 above. Fluids with the following properties and benefits are candidates for use as a fracturing fluid/pad:

1. a crosslinked or highly viscosified fluid which provides a method of controlling fluid loss through filter cake development and establishes hydraulic fracture width;
2. a heavy brine which helps to control fluid loss by having higher filtrate viscosity especially in the high permeability lower zone, providing additional viscosity fluid loss control; and
3. a crosslinked or highly viscosified gel pad which also provides a medium that enhances viscous fingering by a less viscosified slurry.

Hydroxyl-ethyl cellulose (HEC) was chosen as the gelling agent in a calcium chloride brine for the initial portion of the fracturing treatment (the pad fluid). The brine was nearly saturated calcium chloride and cross-linked with a zirconium oxychloride solution.

E. Breaker Design

After the proppant is mixed with the viscous carrier fluid and pumped downhole into the fracture, the fracturing and carrier fluids should be removed as much as possible from the proppant pack without removing the proppant from the fracture and without damaging the conductivity of the proppant pack. To accomplish this it is necessary to thin the viscous carrier fluid that transported the proppant to a near-water state for optimal removal from the propped fracture. Chemical breakers used to reduce viscosity of guar, derivatized guar and HEC polymers are generally grouped into three classes: oxidizers, enzymes, and acids. Several breakers were tested to find the optimum breaker. It was found that the combination of a strong oxidizer with a catalyst gave the optimum performance. Furthermore, this breaker did not appear to adversely affect the cross-linking rate of the pad fluid.

Alternatively, it is possible to simply use water and walnut hulls which will ride atop the pad fluid to be positioned in the lower permeability zone resting atop the higher permeability zone.

III. Example of Production Enhancement

A production facility and well operating generally as shown in FIG. 1 was subjected to the dual stage proppant placement treatment technique of the present invention. A hydrocarbon bearing formation had a higher permeability lower zone with an overlying lower permeability upper zone. The formation was fractured and proppant selectively placed in the top portion of the resultant fracture(s) as described above with respect to the dual stage embodiment of this invention.

The production of hydrocarbons before the fracture stimulation treatment of this invention was employed was 31 barrels of oil per day (bopd) with a watercut of 95%. The production, taken two months after the fracture stimulation treatment of this invention was employed, increased to 86 bopd with a watercut of 80%.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for enhancing the production of hydrocarbons from a subterranean formation, the method comprising:

(a) fracturing a hydrocarbon bearing formation surrounding a well bore with a fracturing fluid to create at least one fracture in the formation, the formation including a higher permeability zone and a lower permeability zone with the at least one fracture extending across both the higher and lower permeability zones;

(b) selectively positioning a majority of the proppant in the lower permeability zone of the at least one fracture using a carrier fluid; and (c) allowing the at least one fracture to close about the majority of the proppant to create at least one high conductivity channel in the lower permeability zone;

whereby the overall productivity of the lower permeability zone is increased relative to the overall productivity of the higher permeability zone thus enhancing the production of hydrocarbons from the hydrocarbon bearing formation.

2. The method of claim 1 wherein:

the proppant is less dense than the carrier fluid; and the majority of the proppant is selectively positioned in the at least one fracture by floating in the carrier fluid toward the top of the at least one fracture.

3. The method of claim 1 wherein:

the fracturing fluid is also used as the carrier fluid to selectively position the majority of the proppant in the lower permeability zone.

4. The method of claim 1 wherein:

the proppant has specific gravity less than the carrier fluid.

5. The method of claim 1 wherein:

the proppant is crushed walnut hulls.

6. The method of claim 1 wherein:

the lower permeability zone lies above the higher permeability zone.

7. The method of claim 1 wherein:

the formation is fractured with the fracturing fluid in a first stage; and the proppant is transported by the carrier fluid in a second stage to be selectively positioned in the at least one fracture in the lower permeability zone.

8. The method of claim 7 wherein:

the well bore contains perforations adjacent the lower permeability zone; and the fracturing fluid initiates the at least one fracture in the lower permeability zone with the at least one fracture propagating to the higher permeability zone.

9. The method of claim 7 wherein:

the fracturing fluid is substantially positioned in the higher permeability zone and the carrier fluid carrying the proppant is substantially positioned in the lower permeability zone.

10. The method of claim 9 wherein:

the fracturing fluid has a higher density than the carrier fluid when the majority of the proppant is being selectively positioned in the lower permeability zone such that carrier fluid and proppant are selectively positioned atop the fracturing fluid.

11. The method of claim 7 wherein:

the fracturing fluid is cross-linked.

12. The method of claim 11 wherein:

the fracturing fluid includes a chemical breaker to break apart the cross-linked fracturing fluid on a time delayed basis.

13. The method of claim 1 wherein:

the lower permeability zone has a higher concentration of hydrocarbons than does the higher permeability zone.

14. A method for enhancing the production of hydrocarbons from a subterranean formation, the method comprising:

(a) fracturing a hydrocarbon bearing formation surrounding a well bore with a fracturing fluid to create at least one fracture in the formation, the formation including a higher hydrocarbon concentration zone and a lower hydrocarbon concentration zone with the at least one fracture extending across both zones;

(b) selectively positioning a majority of the proppant in the higher hydrocarbon concentration zone using a carrier fluid; and (c) allowing the at least one fracture to close about the majority of the proppant to create at least one high conductivity channel in the higher hydrocarbon concentration zone;

whereby the overall productivity of the higher concentration hydrocarbon zone is increased relative to the overall productivity of the lower hydrocarbon concentration zone thus enhancing the production of hydrocarbons from the hydrocarbon bearing formation.

15. The method of claim 14 wherein:

the proppant is less dense than the carrier fluid; and the majority of the proppant is selectively positioned in at least one fracture by floating in the carrier fluid toward the top of the at least one fracture.

16. The method of claim 14 wherein:

the fracturing fluid is also used as the carrier fluid to selectively position the majority of the proppant in the higher hydrocarbon concentration zone.

17. The method of claim 14 wherein:

the proppant has specific gravity less than the carrier fluid.

18. The method of claim 14 wherein:

the formation is fractured with the fracturing fluid in a first stage; and the proppant is transported by the carrier fluid in a subsequent second stage to be selectively positioned in the at least one fracture in the higher hydrocarbon concentration zone.

19. The method of claim 18 wherein:

the well bore contains perforations adjacent to the higher hydrocarbon concentration zone; and the fracturing fluid initiates the at least one fracture in the higher hydrocarbon concentration zone with the at least one fracture subsequently propagating to the lower hydrocarbon concentration zone.

20. The method of claim 14 wherein:

the fracturing fluid has a higher viscosity than the carrier fluid when the majority of the proppant is being selectively positioned in the lower permeability zone such that carrier fluid and proppant are selectively positioned atop the fracturing fluid.

* * * * *